United States Patent
Kim

(10) Patent No.: US 11,226,487 B2
(45) Date of Patent: Jan. 18, 2022

(54) DISPLAY APPARATUS FOR VEHICLES AND METHOD OF CONTROLLING THE SAME

(71) Applicant: HYUNDAI MOBIS CO., LTD., Seoul (KR)

(72) Inventor: Gun Woo Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 16/728,950

(22) Filed: Dec. 27, 2019

(65) Prior Publication Data

US 2020/0209623 A1 Jul. 2, 2020

(30) Foreign Application Priority Data

Jan. 2, 2019 (KR) .................. 10-2019-0000100

(51) Int. Cl.
| | |
|---|---|
| *G02B 27/01* | (2006.01) |
| *H04N 9/31* | (2006.01) |
| *G02F 1/137* | (2006.01) |
| *B60J 3/04* | (2006.01) |
| *G02F 1/166* | (2019.01) |
| *G02F 1/163* | (2006.01) |
| *B60K 35/00* | (2006.01) |
| *G02F 1/1334* | (2006.01) |

(52) U.S. Cl.
CPC ............ *G02B 27/0103* (2013.01); *B60J 3/04* (2013.01); *G02F 1/137* (2013.01); *H04N 9/3161* (2013.01); *B60K 35/00* (2013.01); *B60K 2370/1529* (2019.05); *B60K 2370/52* (2019.05); *G02F 1/1334* (2013.01); *G02F 1/163* (2013.01); *G02F 1/166* (2019.01)

(58) Field of Classification Search
CPC ....................................................... G02B 27/01
See application file for complete search history.

(56) References Cited

U.S. PATENT DOCUMENTS

| | | | |
|---|---|---|---|
| 2013/0201435 A1* | 8/2013 | Oh .................. | C09K 19/52 349/186 |
| 2014/0168608 A1* | 6/2014 | Disley .............. | G03B 21/32 352/132 |

(Continued)

FOREIGN PATENT DOCUMENTS

| | | |
|---|---|---|
| KR | 10-2014-0130802 A | 11/2014 |
| KR | 10-1520660 B1 | 5/2015 |

*Primary Examiner* — Robin J Mishler
(74) *Attorney, Agent, or Firm* — NovoTechIP International PLLC

(57) ABSTRACT

Disclosed herein are a display apparatus for vehicles and a method of controlling the same. The display apparatus for vehicles includes a projection glass having a variable transmittance, a variable glass driving unit configured to adjust the transmittance of the projection glass, a projector configured to display an image on the projection glass, an image input unit configured to receive an image to be projected onto the projection glass, a mode selection unit configured to select an operation mode of the projection glass, and a control unit configured, according to the selection of the mode selection unit, to drive the variable glass driving unit to adjust the transmittance of the projection glass and to project the image, input from the image input unit, onto the projection glass through the projector.

7 Claims, 7 Drawing Sheets

(a) HUD MODE (b) SCREEN (c) BLIND MODE

(56) References Cited

U.S. PATENT DOCUMENTS

| | | | |
|---|---|---|---|
| 2016/0054631 A1* | 2/2016 | Lee | G02B 27/01 |
| | | | 359/275 |
| 2017/0313248 A1* | 11/2017 | Kothari | H04N 5/247 |
| 2018/0086260 A1* | 3/2018 | Barillot | B60Q 3/16 |
| 2019/0111945 A1* | 4/2019 | Wiegand | G05D 1/0246 |
| 2019/0213937 A1* | 7/2019 | Oshima | G02B 27/01 |

* cited by examiner

FIG. 3

| OPERATION MODE | HUD MODE | NORMAL MODE | SCREEN MODE | BLIND MODE |
|---|---|---|---|---|
| PROJECTION GLASS | TRANSPARENT | TRANSPARENT | OPAQUE | OPAQUE |
| PROJECTOR | ON | OFF | ON | OFF |

(a) HUD MODE (b) NORMAL MODE (c) SCREEN MODE (d) BLIND MODE

DISPLAY APPARATUS FOR VEHICLES AND METHOD OF CONTROLLING THE SAME

CROSS-REFERENCE TO RELATED APPLICATION

The present application claims priority under 35 U.S.C. § 119(a) to Korean Patent Application No. 10-2019-0000100, filed on Jan. 2, 2019 in the Korean Intellectual Property Office, which is incorporated herein by reference in its entirety.

BACKGROUND

1. Technical Field

Embodiments of the present disclosure relate to a display apparatus for vehicles and a method of controlling the same, and more particularly, to a display apparatus for vehicles, capable of displaying an AV image as well as vehicle driving information by installing a projection glass, whose transmittance is optically adjustable, on a windshield of a vehicle, thereby providing a variety of display modes to increase utilization as well as providing a clear image to improve driver convenience, and a method of controlling the same.

2. Related Art

Recently, most vehicles are equipped with navigation systems to show a driver a destination and directions. In recent years, a vehicle has also been released that is equipped with a head-up display (HUD) to project desired information onto the windshield of the vehicle so that a driver may obtain the projected information while keeping his/her eyes forward.

Furthermore, research is ongoing for displaying specific information in the form of augmented reality (AR) through an HUD.

The AR is a technology that superimposes a three-dimensional virtual object on the real world that a user sees with his/her eyes, which is also called mixed reality (MR) since it combines a virtual world, to which information is added in real time, with the real world to display the combined world in a single image.

Such a vehicle display apparatus may more effectively transmit various images including driving information to a driver while a vehicle is driving.

Recently, a variety of convenience devices, for example, separate display apparatuses such as AV devices for watching a movie or TV, are also installed in a vehicle.

Accordingly, there is a demand for efforts to make complex use of such a vehicle display apparatus and for a clear image therein.

The related art of the present disclosure is disclosed in Korean Patent Application Publication No. 2014-0130802 (published on Nov. 12, 2014, entitled "Head-Up Display System").

SUMMARY

Various embodiments are directed to a display apparatus for vehicles, capable of displaying an AV image as well as vehicle driving information by installing a projection glass, whose transmittance is optically adjustable, on a windshield of a vehicle, thereby providing a variety of display modes to increase utilization as well as providing a clear image to improve driver convenience, and a method of controlling the same.

In an embodiment, there is provided a display apparatus for vehicles, which includes a projection glass having a variable transmittance, a variable glass driving unit configured to adjust the transmittance of the projection glass, a projector configured to display an image on the projection glass, an image input unit configured to receive an image to be projected onto the projection glass, a mode selection unit configured to select an operation mode of the projection glass, and a control unit configured, according to the selection of the mode selection unit, to drive the variable glass driving unit to adjust the transmittance of the projection glass and to project the image, input from the image input unit, onto the projection glass through the projector.

The projection glass may include a first transparent glass, a holographic optical element (HOE) film, a variable film, and a second transparent glass, which are sequentially stacked.

The variable film may be one of a polymer dispersed liquid crystal (PDLC) film, a suspended particle device (SPD) film, and an electrochromic (LC) film.

The projector may be a laser light source projector.

The operation mode may include an HUD mode, a normal mode, a screen mode, and a blind mode.

When the HUD mode is selected by the mode selection unit, the control unit may drive the variable glass driving unit and operate the projector to project a driving information image, input from the image input unit, onto the projection glass.

When the normal mode is selected by the mode selection unit, the control unit may drive the variable glass driving unit.

When the screen mode is selected by the mode selection unit, the control unit may stop the driving of the variable glass driving unit and operate the projector to project image information, input from the image input unit, onto the projection glass.

When the blind mode is selected by the mode selection unit, the control unit may stop the driving of the variable glass driving unit.

In an embodiment, there is provided a method of controlling a display apparatus for vehicles, which includes receiving an operation mode of a projection glass from a mode selection unit by a control unit, selectively driving a variable glass driving unit, configured to adjust a transmittance of the projection glass, according to the operation mode by the control unit, and projecting an image, input from an image input unit, onto the projection glass through a projector according to the operation mode after controlling the driving of the variable glass driving unit by the control unit.

The operation mode may include an HUD mode, a normal mode, a screen mode, and a blind mode.

The selectively driving a variable glass driving unit may include driving the variable glass driving unit by the control unit when the operation mode is the HUD mode or the normal mode.

The selectively driving a variable glass driving unit may include stopping the driving of the variable glass driving unit by the control unit when the operation mode is the screen mode or the blind mode.

The projecting an image may include operating the projector to project a driving information image, input from the image input unit, onto the projection glass by the control unit when the operation mode is the HUD mode.

The projecting an image may include operating the projector to project image information, input from the image input unit, onto the projection glass by the control unit when the operation mode is the screen mode.

As apparent from the above description, in accordance with the display apparatus for vehicles and the method of controlling the same according to the embodiments of the present disclosure, it is possible to display an AV image as well as vehicle driving information by installing the projection glass, whose transmittance is optically adjustable and which includes the HOE film allowing for image projection, on the windshield of the vehicle, thereby providing a variety of display modes to increase utilization as well as providing a clear image to improve driver convenience.

BRIEF DESCRIPTION OF THE DRAWINGS

FIG. 3 is a table illustrating an operation mode of the projection glass in the display apparatus for vehicles according to the embodiment of the present disclosure.

DETAILED DESCRIPTION

Hereinafter, a display apparatus for vehicles and a method of controlling the same according to the present disclosure will be described with reference to the accompanying drawings through various examples of embodiments. It should be noted that the drawings are not necessarily to scale and may be exaggerated in thickness of lines or sizes of components for clarity and convenience of description. Furthermore, the terms as used herein are terms defined in consideration of functions of the disclosure and may change depending on the intention or practice of a user or an operator. Therefore, these terms should be defined based on the overall disclosures set forth herein.

Figure 1:
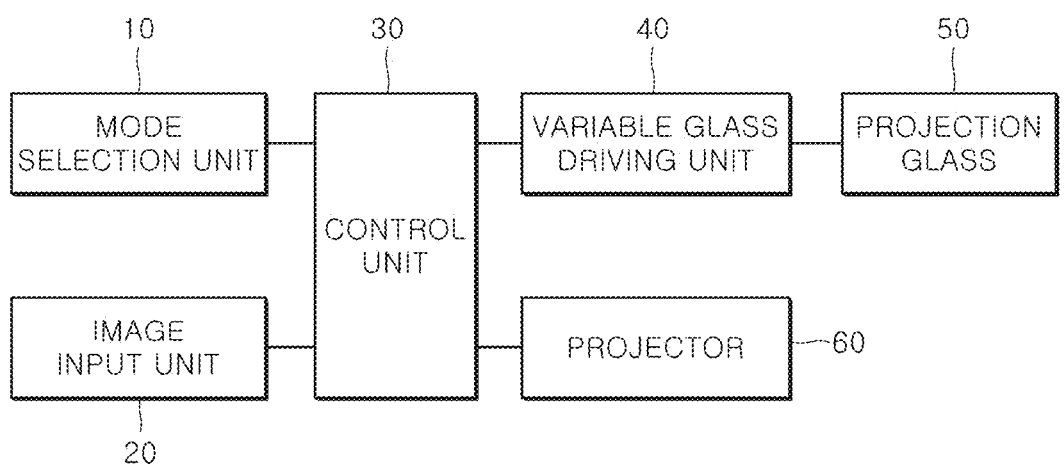
FIG. 1 is a block diagram illustrating a display apparatus for vehicles according to an embodiment of the present disclosure.
Figure 2:
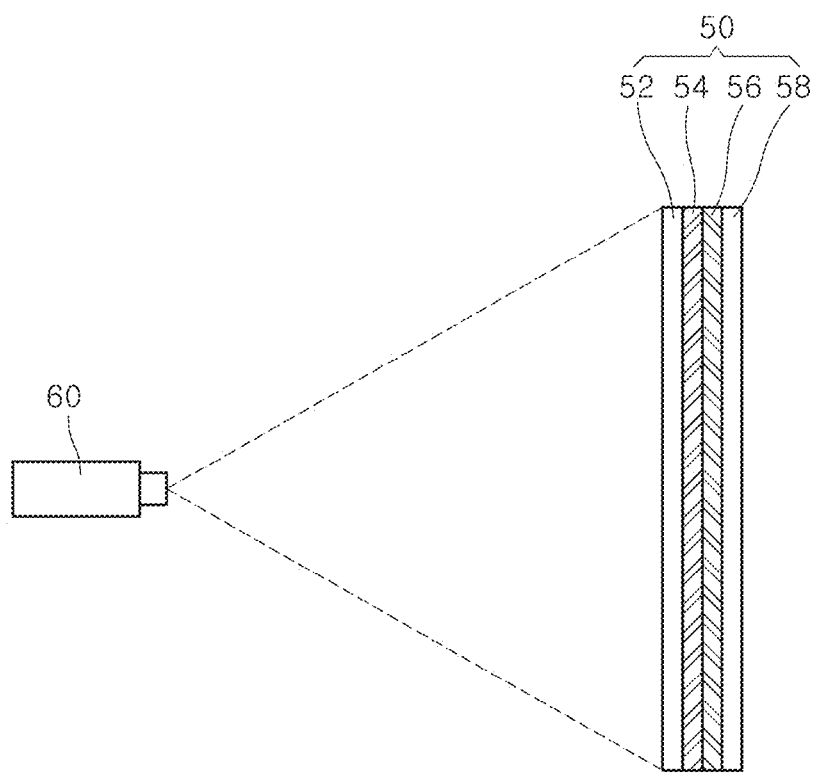
FIG. 2 is a view illustrating a projection glass in the display apparatus for vehicles according to the embodiment of the present disclosure.
Figure 4:
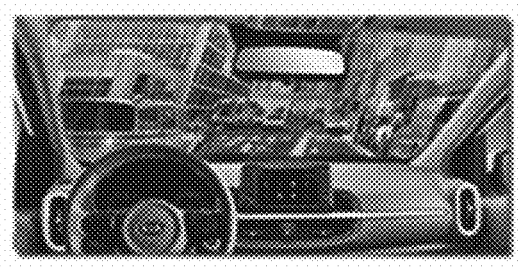
FIG. 4 is a view illustrating an example in which the display apparatus for vehicles according to the embodiment of the present disclosure is applied to a windshield.
Figure 4:
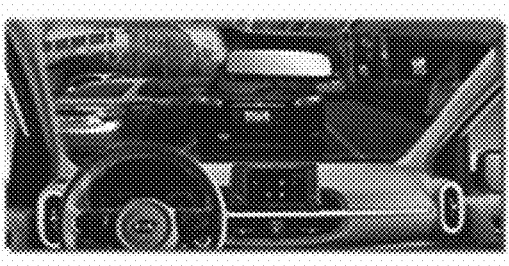
Figure 4:
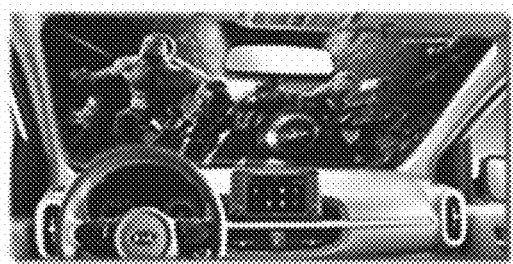
Figure 4:
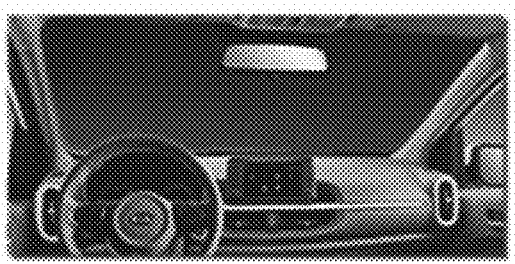
Figure 5:
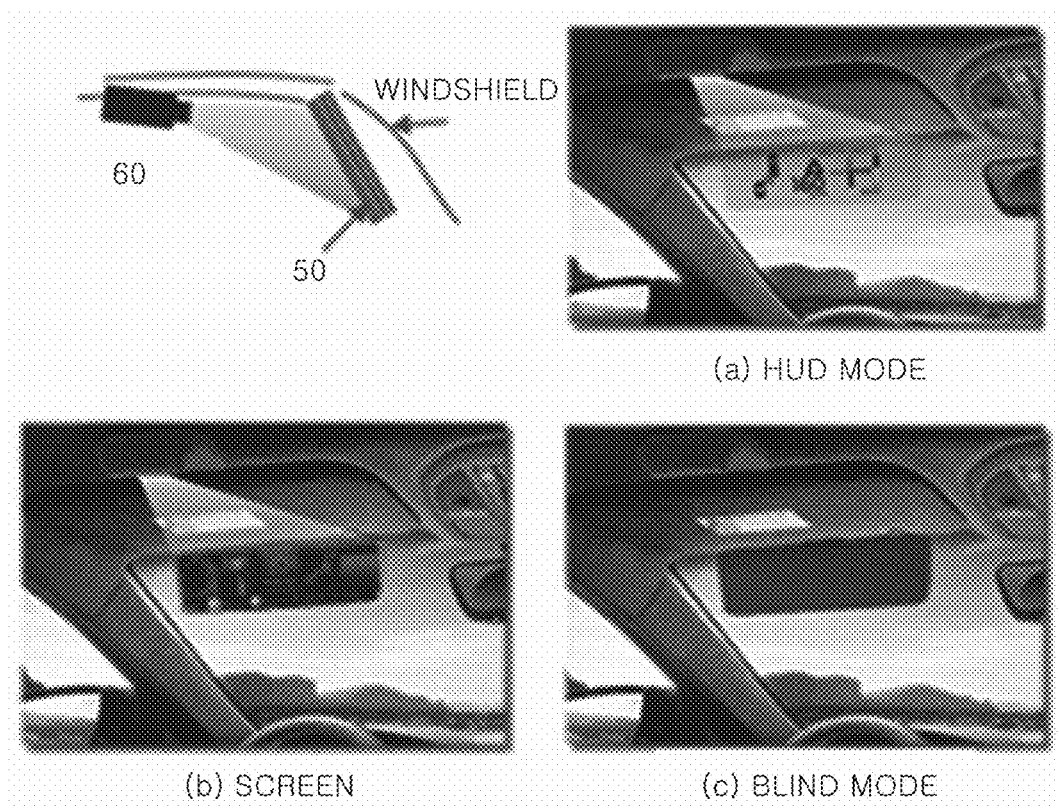
FIG. 5 is a view illustrating an example in which the display apparatus for vehicles according to the embodiment of the present disclosure is applied to a sun visor.
Figure 6:
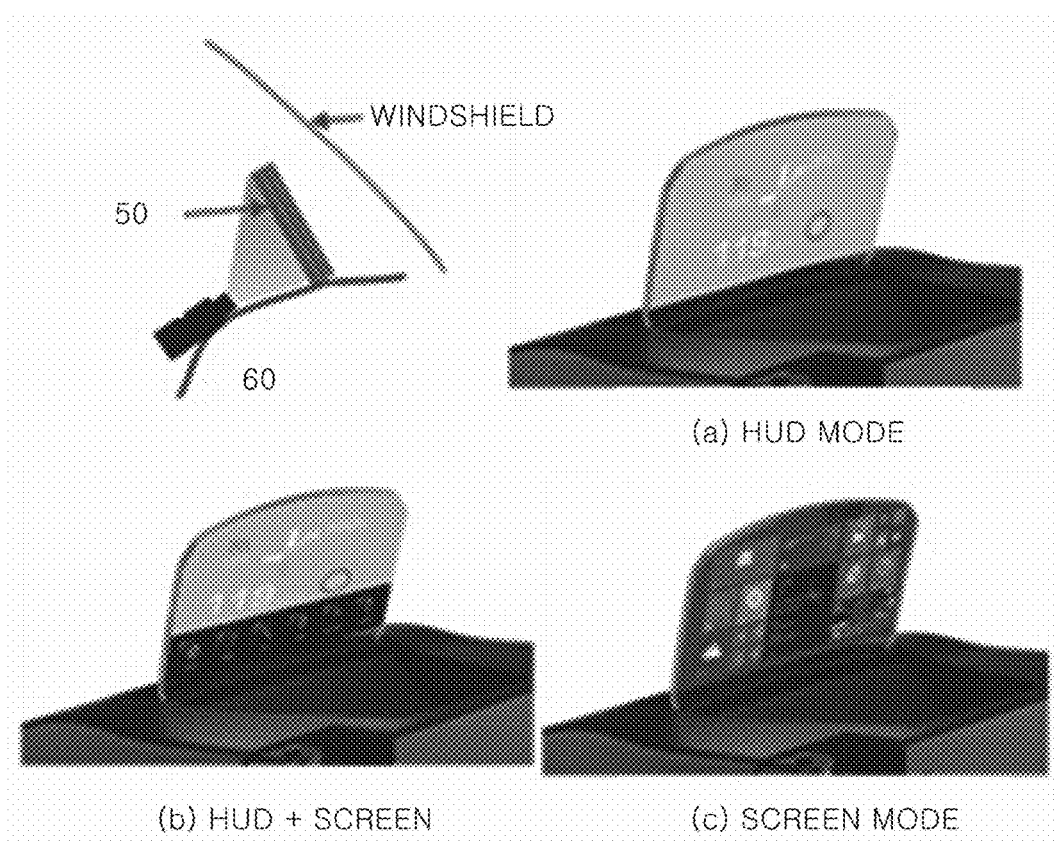
FIG. 6 is a view illustrating an example in which the display apparatus for vehicles according to the embodiment of the present disclosure is applied to a combiner HUD.

FIG. 1 is a block diagram illustrating a display apparatus for vehicles according to an embodiment of the present disclosure. FIG. 2 is a view illustrating a projection glass in the display apparatus for vehicles according to the embodiment of the present disclosure. FIG. 3 is a table illustrating an operation mode of the projection glass in the display apparatus for vehicles according to the embodiment of the present disclosure. FIG. 4 is a view illustrating an example in which the display apparatus for vehicles according to the embodiment of the present disclosure is applied to a windshield. FIG. 5 is a view illustrating an example in which the display apparatus for vehicles according to the embodiment of the present disclosure is applied to a sun visor. FIG. 6 is a view illustrating an example in which the display apparatus for vehicles according to the embodiment of the present disclosure is applied to a combiner HUD.

As is traditional in the corresponding field, some exemplary embodiments may be illustrated in the drawings in terms of functional blocks, units, and/or modules. Those of ordinary skill in the art will appreciate that these block, units, and/or modules are physically implemented by electronic (or optical) circuits such as logic circuits, discrete components, processors, hard-wired circuits, memory elements, wiring connections, and the like. When the blocks, units, and/or modules are implemented by processors or similar hardware, they may be programmed and controlled using software (e.g., code) to perform various functions discussed herein. Alternatively, each block, unit, and/or module may be implemented by dedicated hardware or as a combination of dedicated hardware to perform some functions and a processor (e.g., one or more programmed processors and associated circuitry) to perform other functions. Each block, unit, and/or module of some exemplary embodiments may be physically separated into two or more interacting and discrete blocks, units, and/or modules without departing from the scope of the inventive concept. Further, blocks, units, and/or module of some exemplary embodiments may be physically combined into more complex blocks, units, and/or modules without departing from the scope of the inventive concept.

As illustrated in FIGS. 1 and 2, the display apparatus for vehicles according to the embodiment of the present disclosure may include a projection glass 50, a variable glass driving unit 40, a projector 60, an image input unit 20, a mode selection unit 10, and a control unit 30.

The projection glass 50 is a glass having a variable transmittance, and may be installed on the front surface of a windshield of a vehicle as illustrated in FIG. 4. The projection glass 50 may be applied to a sun visor as illustrated in FIG. 5 as well as to a display screen of a combiner HUD as illustrated in FIG. 6.

As illustrated in FIG. 2, the projection glass 50 may have a structure in which a first glass 52, a holographic optical element (HOE) film 54, a variable film 56, and a second glass 58 are sequentially stacked.

The variable film 56 is a film whose transparency is adjustable through supply of electricity, and may be one of a polymer dispersed liquid crystal (PDLC) film, a suspended particle device (SPD) film, and an electrochromic (LC) film.

Thus, it is possible not only to provide a projection surface suitable for various display modes through the projection glass 50 but also to minimize interference with peripheral images through the variable film 56 and the HOE film 54 to provide a clearer image.

The variable glass driving unit 40 may supply electric power to the variable film 56 of the projection glass 50 to adjust the transmittance thereof. To this end, the driving unit 40 may include a cable, a circuit, and the like for supply of electric power.

The projector 60 is a laser light source projector, and projects and displays a driving information image and an AV image on the projection glass 50.

Particularly, by implementing an image on the HOE film 54 of the projection glass 50 through the laser light source projector, it is possible to provide a clear image without separately adjusting a focus.

The image input unit 20 may receive a driving information image and AV image to be projected onto the projection glass 50. The image input unit 20 may receive image information from other systems (e.g., an AVN system and a navigation system) inside the vehicle, and may include an input terminal and communication module coupled to the control unit 30 or may include an input terminal and communication module directly connected to the projector 60.

The mode selection unit 10 may select an operation mode of the projection glass 50. The mode selection unit may include a configuration such as a button to allow a user to select an operation mode or may include a circuit configuration to allow a control signal to be received from the button or the like through CAN communication.

The operation mode may include an HUD mode, a normal mode, a screen mode, and a blind mode.

The control unit 30, according to the selection of the mode selection unit 10, may drive the variable glass driving unit 40 to make the projection glass 50 transparent or opaque by adjusting the transmittance thereof, and may operate the projector 60 to project the driving information image and AV image, input from the image input unit 20, onto the projection glass 50.

In other words, as illustrate in FIG. 3, the control unit 30, according to any one of the HUD mode, the normal mode, the screen mode, and the blind mode, may drive the variable glass driving unit 40 to make the projection glass 50 transparent or may stop the driving of the variable glass driving unit 40 to make the projection glass 50 opaque, and may operate the projector 60 to project the driving information image and AV image, input from the image input unit 20, onto the projection glass 50.

That is, when the HUD mode is selected, the control unit 30 may drive the variable glass driving unit 40 to make the projection glass 50 transparent, and may operate the projector 60 to project the driving information image, input from the image input unit 20, onto the projection glass 50.

In this case, it is possible to provide a clearer image through the projector 60, as a laser light source projector, and the HOE film 54 of the projection glass 50.

When the normal mode is selected, the control unit 30 may drive the variable glass driving unit 40 to make the projection glass 50 transparent, and may not operate the projector 60 to keep the projection glass 50 transparent.

When the screen mode is selected, the control unit 30 may stop the driving the variable glass driving unit 40 to make the projection glass 50 opaque, and may operate the projector 60 to project the AV image, input from the image input unit 20, onto the projection glass 50 to use the projection glass 50 as a screen.

Thus, it is possible to minimize interference with peripheral images outside the vehicle and project a clearer AV image.

When the blind mode is selected, the control unit 30 may stop the driving of the variable glass driving unit 40 to make the projection glass 50 opaque, and may not operate the projector 60 to keep the projection glass 50 opaque.

For example, when the projection glass 50 is installed on the front surface of the windshield as illustrated in FIG. 4, a driving information image may be projected onto the projection glass 50 to use the front surface of the windshield as an HUD in the HUD mode as illustrated in (a), the projection glass 50 may be made transparent to be typically kept transparent in the normal mode as illustrated in (b), the projection glass 50 may be made opaque for use as a screen to project various types of information including an AV image such as entertainment in the screen mode as illustrated in (c), and the projection glass 50 may be made opaque to be used for sun protection or internal security or during parking in the blind mode as illustrated in (d).

When the projection glass 50 is applied to a sun visor as illustrated in FIG. 5, (a) may illustrate an HUD mode to project a driving information image, (b) may illustrate a screen mode to project an AV image such as entertainment, and (c) may illustrate a blind mode for use as a sun visor.

When the projection glass 50 is applied to a combiner HUD as illustrated in FIG. 6, (a) may illustrate an HUD mode to project a driving information image, (b) may illustrate that the projection glass 50 is utilized for divided HUD and screen modes, and (c) may illustrate a screen mode to display an AV image such as entertainment and various types of information.

As described above, the display apparatus for vehicles according to the embodiment of the present disclosure can display an AV image as well as vehicle driving information by installing the projection glass, whose transmittance is optically adjustable, on the windshield of the vehicle, thereby providing a variety of display modes to increase utilization as well as providing a clear image to improve driver convenience.

Figure 7:
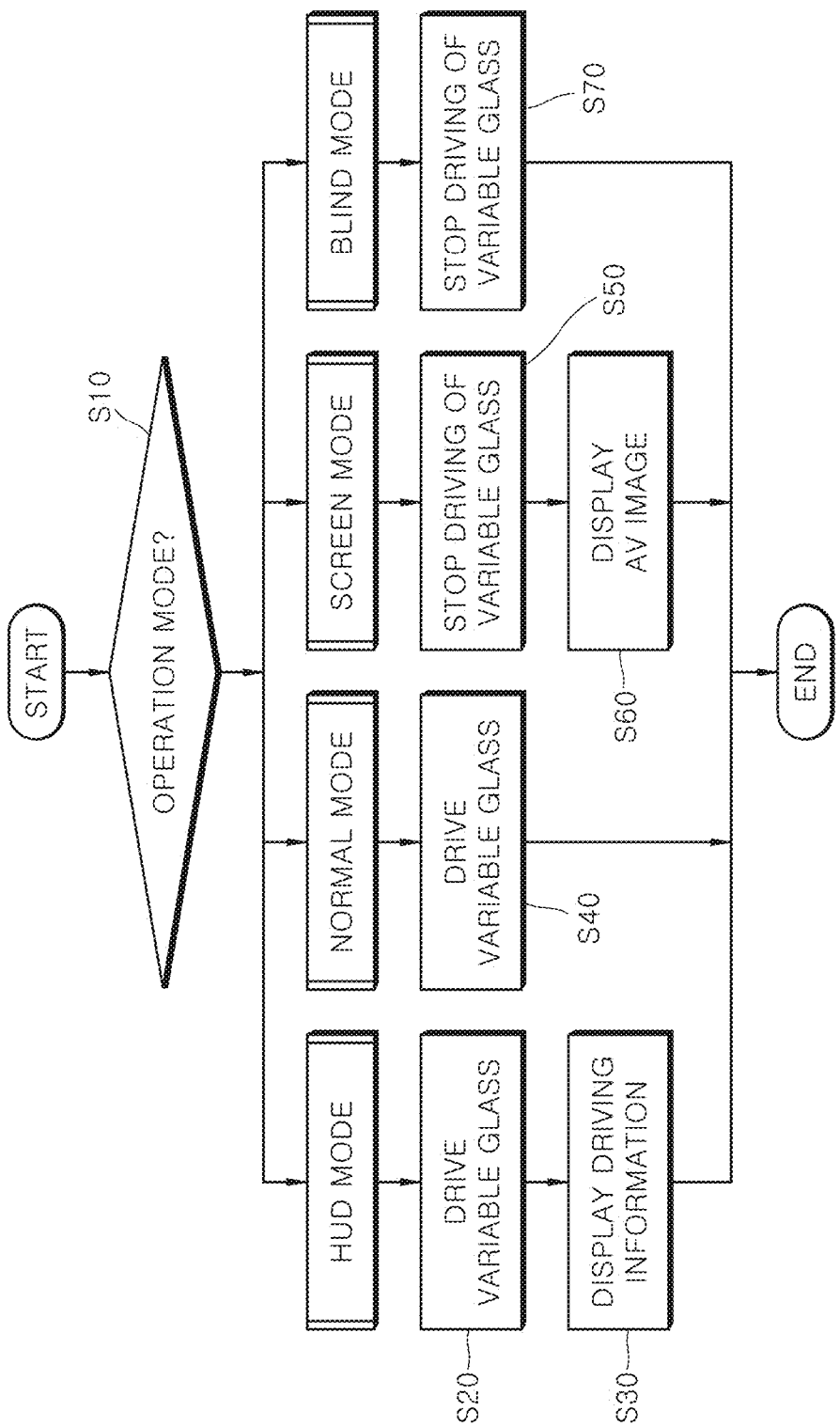
FIG. 7 is a flowchart for explaining a method of controlling a display apparatus for vehicles according to an embodiment of the present disclosure.

FIG. 7 is a flowchart for explaining a method of controlling a display apparatus for vehicles according to an embodiment of the present disclosure.

As illustrated in FIG. 7, in the method of controlling a display apparatus for vehicles according to the embodiment of the present disclosure, a control unit 30 first receives an operation mode of a projection glass 50 from a mode selection unit 10 to determine the operation mode (S10).

The operation mode may include an HUD mode, a normal mode, a screen mode, and a blind mode.

When the operation mode input in step S10 is the HUD mode, the control unit 30 drives the variable glass driving unit 40 to make the projection glass 50 transparent (S20).

After making the projection glass 50 transparent in step S20, the control unit 30 operates a projector 60 to project and display a driving information image, input from an image input unit 20, on the projection glass 50, thereby enabling the projection glass 50 to be used as an HUD as in (a) of FIG. 4 (S30).

When the operation mode input in step S10 is the normal mode, the control unit 30 drives the variable glass driving unit 40 to make the projection glass 50 transparent, thereby enabling the projection glass 50 to be used as a typical windshield as in (b) of FIG. 4 (S40).

When the operation mode input in step S10 is the screen mode, the control unit 30 stops the driving of the variable glass driving unit 40 to make the projection glass 50 opaque (S50).

After making the projection glass 50 opaque in step S50, the control unit 30 operates the projector 60 to project an AV image, input from the image input unit 20, onto the projection glass 50, thereby enabling the projection glass 50 to be used as a screen as in (c) of FIG. 4 (S60).

When the operation mode input in step S10 is the blind mode, the control unit 30 stops the driving of the variable glass driving unit 40 to make the projection glass 50 opaque, thereby enabling the projection glass 50 to be used for sun protection or internal security or during parking as in (d) of FIG. 4 (S70).

As described above, in accordance with the method of controlling a display apparatus for vehicles according to the embodiment of the present disclosure, it is possible to display an AV image as well as vehicle driving information by installing the projection glass, whose transmittance is optically adjustable, on the windshield of the vehicle, thereby providing a variety of display modes to increase utilization as well as providing a clear image to improve driver convenience.

While various embodiments have been described above, it will be understood by those skilled in the art that the embodiments described are by way of example only. It will be apparent to those skilled in the art that various modifications and other equivalent embodiments may be made without departing from the spirit and scope of the disclosure. Accordingly, the true technical protection scope of the disclosure should be defined by the appended claims.

What is claimed is:

1. A display system for a vehicle, comprising:
    a sun visor positioned on a top portion of an inner surface of a windshield of the vehicle and comprising a projection glass having a variable transmittance;
    a variable glass driving unit configured to adjust the transmittance of the projection glass;
    a projector configured to display an image on the projection glass;
    an image input unit configured to receive an image to be projected onto the projection glass;
    a mode selection unit configured to select one of a plurality of operation modes of the projection glass, the plurality of operation modes comprising:
        a head-up display (HUD) mode for rendering the projection glass transparent and projecting driving information to the transparent projection glass;
        a screen mode for rendering the projection glass opaque and projecting an audiovisual (AV) image to the opaque projection glass; and
        a blind mode for rendering the projection glass opaque and no image is projected to the opaque projection glass; and
    a control unit configured, according to the operation mode selected by the mode selection unit, to control the variable glass driving unit and the projector,
    wherein the control unit is further configured to:
        in response to determining that the mode selection unit has selected the HUD mode, perform:
            controlling the variable glass driving unit to render the projection glass transparent; and
            controlling the projector to project driving information of the vehicle onto the transparent projection glass;
        in response to determining that the mode selection unit has selected the screen mode, perform:
            controlling the variable glass driving unit to render the projection glass opaque; and
            controlling the projector to project the AV image to the opaque projection glass; and
        in response to determining that the mode selection unit has selected the blind mode, perform:
            controlling the variable glass driving unit to render the projection glass opaque; and
            controlling the projector such that no image is projected to the opaque projection glass.

2. The display system of claim 1, wherein the projection glass comprises a first transparent glass, a holographic optical element (HOE) film, a variable film, and a second transparent glass, which are sequentially stacked.

3. The display system of claim 2, wherein the variable film is one of a polymer dispersed liquid crystal (PDLC) film, a suspended particle device (SPD) film, and an electrochromic (LC) film.

4. The display system of claim 1, wherein the projector is a laser light source projector.

5. The display system of claim 1, wherein the driving information is an input from the image input unit.

6. The display system of claim 1, wherein the AV image is an input from the image input unit.

7. A method of operating a display system for a vehicle, the display system comprising a sun visor positioned on a top portion of an inner surface of a windshield of the vehicle, the sun visor comprising a projection glass having a variable transmittance, the method comprising:
    receiving a first user input selecting a head-up display (HUD) mode;
    in response to receiving the first user input, performing (1) adjusting variable transmittance of the projection glass to render the projection glass transparent, and (2) projecting driving information to the transparent projection glass;
    receiving a second user input selecting a screen mode;
    in response to receiving the second user input, performing (1) adjusting variable transmittance of the projection glass to render the projection glass opaque, and (2) projecting an audiovisual (AV) image to the opaque projection glass;
    receiving a third user input selecting a blind mode;
    in response to receiving the third user input, performing (1) adjusting variable transmittance of the projection glass to render the projection glass opaque, and (2) preventing any image from being projected to the opaque projection glass.

* * * * *